(12) United States Patent
Yin et al.

(10) Patent No.: US 8,182,929 B2
(45) Date of Patent: May 22, 2012

(54) SOLAR ABSORPTIVE MATERIAL FOR A SOLAR SELECTIVE SURFACE COATING

(75) Inventors: Yongbai Yin, Epping (AU); Lingxia Hang, Sydney (AU); David Mills, Roseville (AU)

(73) Assignee: The University of Sydney, Sydney, NSW (AU)

( * ) Notice: Subject to any disclaimer, the term of this patent is extended or adjusted under 35 U.S.C. 154(b) by 793 days.

(21) Appl. No.: 11/817,667

(22) PCT Filed: Mar. 3, 2006

(86) PCT No.: PCT/AU2006/000288
§ 371 (c)(1),
(2), (4) Date: Dec. 19, 2008

(87) PCT Pub. No.: WO2006/092028
PCT Pub. Date: Sep. 8, 2006

(65) Prior Publication Data
US 2009/0151777 A1    Jun. 18, 2009

(30) Foreign Application Priority Data
Mar. 3, 2005   (AU) .................... 2005901000

(51) Int. Cl.
*B32B 17/06*   (2006.01)
*H01L 31/00*   (2006.01)

(52) U.S. Cl. ...... 428/552; 428/610; 428/34.4; 428/34.6; 428/433; 428/469; 428/472; 428/620; 428/632; 428/701; 428/702; 136/252; 136/261; 126/907; 126/908; 126/569; 126/619

(58) Field of Classification Search .................... None
See application file for complete search history.

(56) References Cited

U.S. PATENT DOCUMENTS

| 4,309,261 A | 1/1982 | Harding et al. |
| 5,523,132 A | 6/1996 | Zhang et al. |

FOREIGN PATENT DOCUMENTS

| CA | 1083452 A | 8/1980 |
| JP | 57117449 A | 7/1982 |
| NL | 7705467 | 12/1977 |
| WO | 2005010225 A1 | 2/2005 |

OTHER PUBLICATIONS

Ritchie, I.T; "The Structure of Reactively Sputtered Metal Carbide and Metal Silicide Solar Selective Absorber" Thin Solid Films, Copyright Elsevier-Sequoia S. A. Lausanne, Netherlands; vol. 72, No. 1; Sep. 15, 1980, pp. 65-71.
European Search Report for European Patent Application No. 06704961.9 dated Oct. 8, 2010; 6 pages.
International Search Report dated Mar. 29, 2006 for PCT/AU2006/000288, filed Mar. 3, 2006; 2 pages.
International Preliminary Report on Patentability dated Feb. 13, 2007 for PCT/AU2006/000288, filed Mar. 3, 2006; 4 pages.

*Primary Examiner* — Aaron Austin
(74) *Attorney, Agent, or Firm* — Ganz Law, P.C.

(57) ABSTRACT

The present invention provides a solar absorptive material for a solar selective surface of an absorber of solar radiation. The solar absorptive material comprises a dispersed metallic material and a receiving boundary through which the solar radiation is received. Further, the solar absorptive material comprises a first region and a second region. The first region being located at a position closer to the receiving boundary than the second region and the first region has an average volume fraction of the dispersed metallic material that is larger than that of the second region.

14 Claims, 3 Drawing Sheets

US 8,182,929 B2

SOLAR ABSORPTIVE MATERIAL FOR A SOLAR SELECTIVE SURFACE COATING

CROSS REFERENCE TO RELATED APPLICATIONS

This application is submitted under 35 U.S.C. 371 as a U.S. National Phase application of International Patent Application Number PCT/AU2006/000288, filed Mar. 3, 2006, which claims priority to Australian Application Serial Number 2005901000, filed Mar. 3, 2005, the contents of which are each hereby incorporated by reference as if recited in full herein for all purposes.

FIELD OF THE INVENTION

The present invention broadly relates to a solar absorptive material for a solar selective surface coating.

BACKGROUND OF THE INVENTION

In order to increase the efficiency of solar absorbers, solar selective coatings are applied to the solar absorbers. Such coatings increase absorbance of solar radiation in a spectral range in which the solar radiation has high intensity and reduce loss of energy in the infrared spectral range.

Solar selective coatings for solar absorbers typically comprise a metallic layer on an absorber body, a solar absorptive coating and a top layer. Alternatively, the solar absorptive coating may be positioned directly on a metallic absorber body. The absorptive layer typically comprises a metallic component and a non-metallic component, such as a dielectric component. Typically the metallic material forms islands in the dielectric material so that a Cermet material is formed. The top layer has a metal concentration that is lower than that of the solar absorptive layer or is free of metal. Such a solar selective coating absorbs solar radiation while the emission of infrared radiation is reduced compared with, for example, a uniform metallic coating.

Solar absorptive coatings typically have a non-uniform metal volume fraction. FIG. 1 show plots of metal volume fraction versus depth from an outer boundary for an exemplary selection of such solar absorptive coatings. The figure shows a plot 10 for a coating having a graded metal volume fraction, a multilayer structure 12, and a combination of graded and multilayer profiles 14.

For example, a solar energy reflector array may be used to collect sunlight which is then focused onto the absorber coated with the solar selective surface coating. The collected sunlight heats the absorber and the solar selective coating locally to relative high temperatures such as 350° C. In order to increase the lifetime of the solar selective surface coating at such high temperatures, and to reduce thermal losses of the absorber, the absorber may be positioned in an evacuated housing.

It is known that the conversion efficiency of the energy from the collected sunlight is better at even higher temperatures, but further increase of the temperature may have a substantial negative impact on the lifetime of the solar selective coatings.

The positioning of the absorber with solar selective surface coating in air, which would be advantageous for some applications, can cause even more problems.

There is a need for technological advancement.

SUMMARY OF THE INVENTION

The present invention provides in a first aspect a solar absorptive material for a solar selective surface of an absorber of solar radiation, the solar absorptive material comprising:

a dispersed metallic material,
a receiving boundary through which the solar radiation is received,
a first region and a second region, the first region being located at a position closer to the receiving boundary than the second region, and the first region having an average volume fraction of the dispersed metallic material that is larger than that of the second region.

Such a solar absorptive material typically forms a part of a solar selective surface coating of an absorber body and typically is sandwiched between a surface layer having a lower average metal volume fraction and a reflective bottom layer (or the absorber body itself) having a higher average metal volume fraction or being metallic.

Because the solar absorptive material has a larger average metal volume concentration in the first region which is closer to the receiving boundary than the second region, the solar absorptive material typically has an increased lifetime at elevated temperatures compared with conventional solar absorptive materials. Experiments have shown that embodiments of the solar absorptive material have reduced molecular diffusion which increases the lifetime. Further, conventional solar absorptive materials have a higher concentration of the metallic material at or near the interface between the solar absorptive material and the bottom layer or the absorber body. The solar absorptive material of the present invention may have a reduced concentration of metallic material near the interface which typically improves the adhesion of the solar absorptive material at elevated temperatures.

For example, the solar absorptive material may comprise a third region positioned at a distance below the receiving boundary that is further than that of the second region and having an average metal volume fraction that is larger than that of the second region.

Alternatively or additionally, the solar absorptive material may comprise a fourth region positioned between the first region and the receiving boundary, the first region having an average metal volume fraction larger than that of the fourth region.

At least one region of the solar absorptive material may comprise a dispersion of at least two material components and at least one of the material components comprises itself a composition of more than one material. At least one of the material components typically comprises the metallic material and at least one other material. Alternatively, each of the material components may comprise the metallic material. In another variation at least one of the material components may comprise a dielectric material.

Further in at least one of the regions the metallic material component may be dispersed in a dielectric material or in another metallic material.

In one specific embodiment the average metal volume fraction of at least one of the regions is selected so that diffusion of metallic material from the or each adjacent region is substantially inhibited for a temperature range of 300° C. to 500° C.

In one embodiment of the present invention the solar absorptive material comprises a higher concentration of the dispersed metallic material at or near the receiving boundary than at or near an interface between the solar absorptive material and the bottom layer or the absorber body.

At least one of the regions may be a layer. In one embodiment, the absorptive material comprises a multi-layered structure. Alternatively or additionally, the metallic volume fraction of at least one of the regions may decreases in a direction from the receiving boundary into the material in a gradual manner or may be substantially uniform.

In one particularly advantageous embodiment of the present invention the absorptive material comprises a multi-layered structure having a large number of very thin layers. Each layer may have a thickness of typically more than 20 to 200 Ångstrom. This embodiment has the advantage that the layer thicknesses are small compared to the wavelength of the solar light. Consequently possible interference effects due to reflections at layer interfaces are not problematic.

The dispersed metallic material may comprise any suitable material, such as any suitable metallic material including metal alloys, metal nitrides and transition metals, but typically comprises a silicide material such as a salicide material. Because of the temperature stability of the silicide material, the high temperature suitability of the solar selective material is further improved. The first component typically has a resistivity of less than 50 $\Omega$cm, typically less than 10 $\Omega$cm.

The silicide material may comprise any suitable metallic material including for example a titanium silicide, a tungsten silicide, a cobalt silicide.

A person skilled in the art will appreciate that the solar absorptive material according to embodiments of the present invention has a range of advantages. The concept of having at least one region which has an average metal volume fraction that is larger than that of another region and that is positioned closer to the receiving boundary than the other region offers significant flexibility for design optimisation and facilitates fabrication. For example, the solar absorptive material may comprise multi-layered or multi-region structures having layers or regions with different average metal volume fractions and may be designed having optimised optical properties (i.e. optical material constants). In addition, relatively thick structures may be fabricated and typically controlling of particular parameters is less critical as the metal volume fraction may increase and also decrease during fabrication of the structures.

Further, adhesion of a layer or region may be optimised by selecting an average a metal volume fraction for the layer or region of the solar absorptive material in accordance with the first aspect of the present invention.

In addition, positioning of a layer or region having a lower average metal volume fraction than immediately adjacent layers or regions typically reduces inter-diffusion of metallic material at elevated temperatures and consequently increases the lifetime of the solar selective material. Further, relatively thick structures may be fabricated.

The present invention provides in a second aspect a solar absorptive material for a solar selective surface of an absorber of solar radiation, the solar absorptive material comprising a silicide material for absorptive solar radiation.

The silicide material typically is a salicide material.

The present invention provides in a third aspect an absorber having a solar selective surface coating comprising the solar absorptive material according to the first aspect of the present invention, wherein the absorptive material is sandwiched between an outer layer and a metallic region.

The absorptive material typically is sandwiched between an outer layer and a bottom layer positioned over an absorber body. Alternatively, the absorptive material may be positioned directly on the absorber body. The outer layer typically has a lower metallic volume fraction that the solar absorptive layer (or is non-metallic). The bottom typically has a higher average metal volume fraction than the absorptive material or is metallic. The absorber body typically is also metallic.

The invention will be more fully understood from the following description of specific embodiments of the invention. The description is provided with reference to the accompanying drawings.

DETAILED DESCRIPTION OF SPECIFIC EMBODIMENTS

Figure 1:
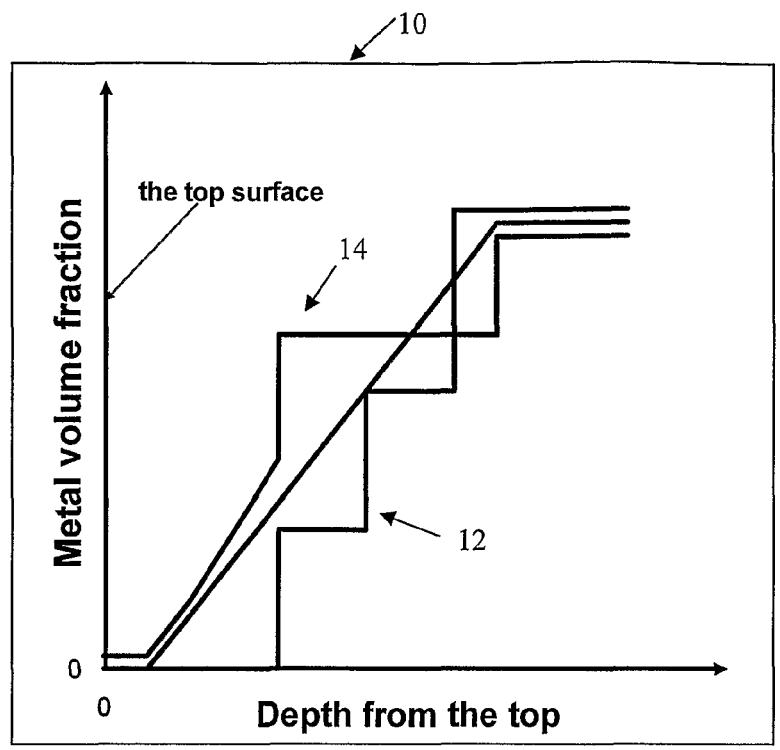
FIG. 1 shows a plot illustrating a depth profile of a relative material component concentration for a solar absorptive material (prior art)
Figure 2:
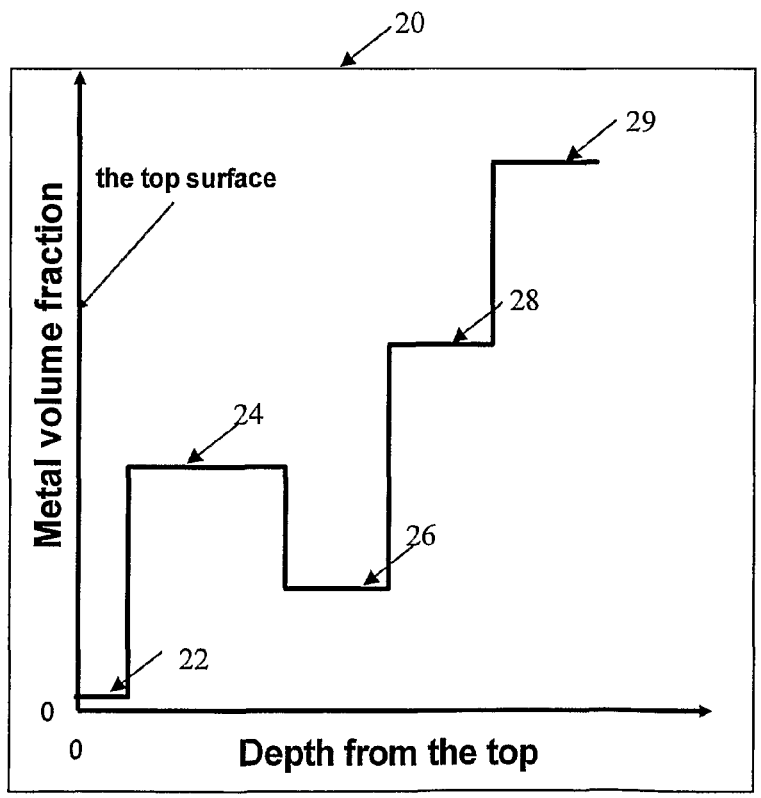
FIG. 2 shows a plot illustrating a depth profile of a relative material component concentration for a solar absorptive material according to a first specific embodiment of the present invention.
Figure 3:
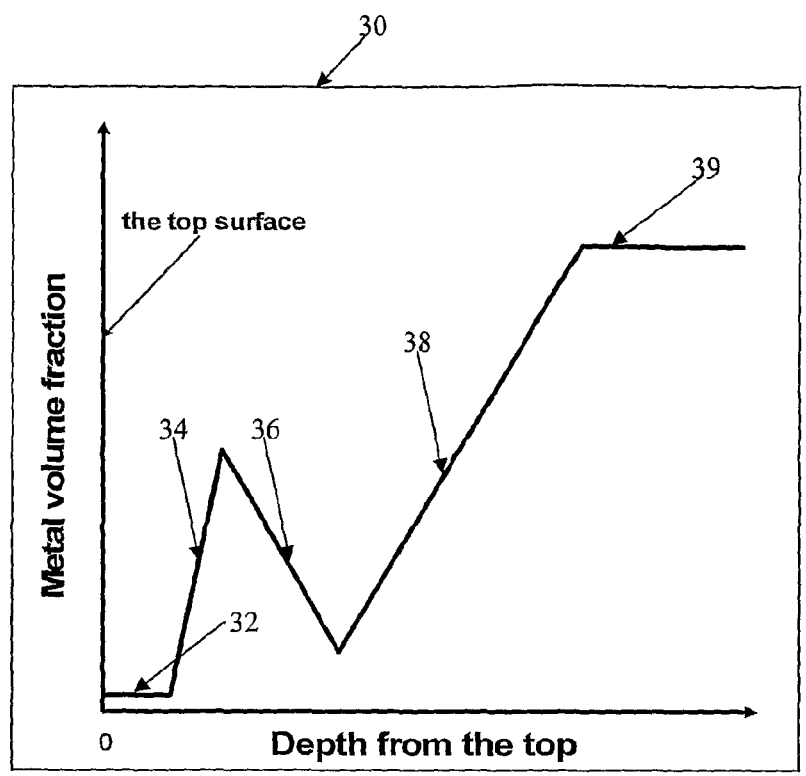
FIG. 3 shows a plot illustrating a depth profile of a relative material component concentration for a solar absorptive material according to a second specific embodiment of the present invention.
Figure 4:
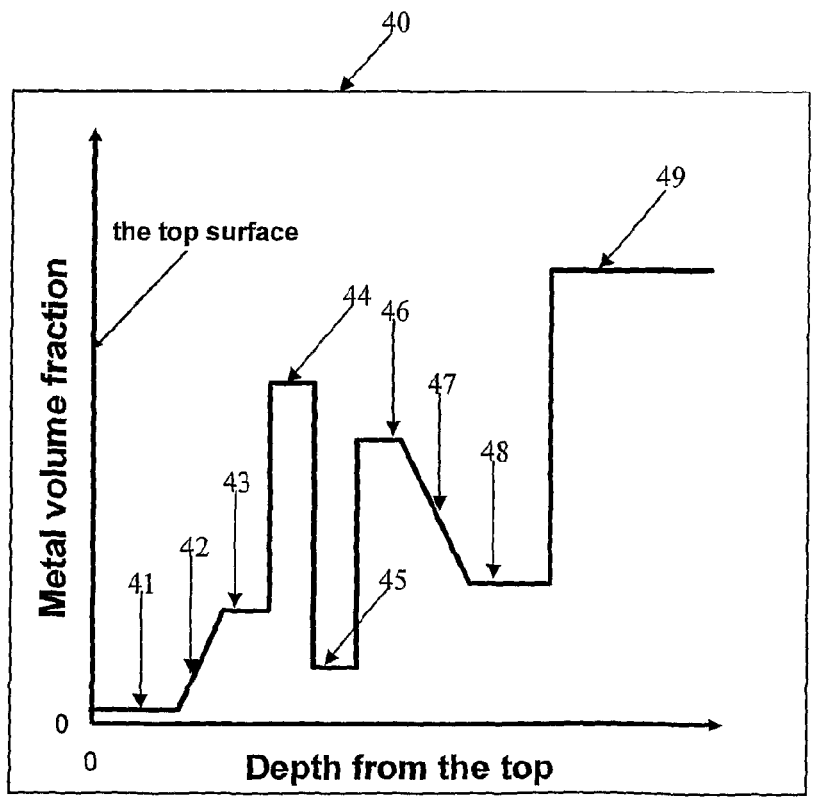
FIG. 4 shows a plot illustrating a depth profile of a relative material component concentration for a solar absorptive material according to a third specific embodiment of the present invention and FIG. 5 shows schematically a side-view of a solar absorber having a solar selective coating according to another specific embodiment of the present invention.

Referring to FIGS. 2-4, solar absorptive materials according to specific embodiments of the present invention are now described. FIGS. 2-4 show depth profiles of relative material concentration which typically is closely related to the electrical conductivity. Consequently, the relative material concentrations could also be represented by depth profiles showing the specific electrical conductivity as a function of depth.

FIG. 2 shows a plot 20 illustrating a depth profile through the solar absorptive material according to the first specific embodiment of the present invention. In this embodiment the solar absorptive material comprises a dispersion of two components. A first component is metallic and typically has a relatively high specific absorption coefficient for visible solar radiation where the solar radiation is of relatively high intensity. A second component is in this example dielectric and at least in part transmissive for visible solar radiation but reflective for infrared radiation emitted by the absorber.

The absorptive material has an outer boundary for receiving the solar radiation and typically is applied to, or forms the part of, a solar selective surface coating on an absorber body. For example, the solar absorptive material may be positioned directly on a metallic absorber body, or may be positioned on a metallic bottom layer over the absorber body and may be covered by a top layer having a low average metal volume fraction (or being substantially free of metals)

The effects of the distribution of the first and second components is shown in plot 20, which identifies regions of the absorptive material having a different relative material component distribution. The plot 20 shows a depth profile through the solar absorptive material comprising regions 22, 24, 26, 28 and 29. The plot schematically shows the metal volume fraction through the entire thickness of the material.

Region 22 has a relatively small average metal volume fraction and is positioned just below the surface. Below region 22 is region 24 which has a slightly higher average metal volume fraction, region 26 has a lower average metal volume fraction and regions 28 and 29 have higher average metal volume fractions.

FIG. 3 shows plot 30 which illustrates a depth profile through a solar absorptive material according to a second specific embodiment of the present invention. In this embodiment the solar absorptive material comprises regions 32, 34, 36, 38 and 39. Regions 34, 36 and 38 have a graded metal volume fraction. Region 32, positioned just below the outer boundary surface (or top surface if the absorptive material is not coated), has a relatively small average metal volume fraction. Region 36 has a graded metal volume fraction that decreases in a direction from the surface through the region. Region 38 has a metal volume fraction that increases in a direction from the surface through the region. Region 39 has a uniform metal volume fraction.

FIG. 4 shows a plot 40 illustrating a depth profile through a solar absorptive material according to a third specific embodiment of the present invention. In this embodiment the depth profile includes regions with substantially constant metal volume fraction regions and also regions with a graded metal volume fraction. The material comprises regions 41, 42, 43, 44, 45, 46, 47, 48 and 49. The region 41 is positioned just below the surface and has a relatively small, uniform metal volume fraction. The region 42 has a metal volume fraction that increases in a graded manner from the interface to region 41 to the interface of the region 43. The region 45, between two adjacent higher metal volume fraction regions, can be thought of an insulating region because it can reduce inter-diffusion of metal atoms. The regions 44, 45 and 46 have a uniform metal volume fraction which differ from one another and the region 47 has a metal volume fraction that gradually increases from the interface to the region 46 to the interface to the region 48. Region 48 has a uniform metal volume fraction.

A person skilled in the art will appreciate that in each embodiment the average metal volume fraction of the material typically is closely related to the optical properties of the material in the visible solar energy range. If the average metal volume fraction in a first region of the material is larger than in a second region, the absorbance of the first region typically is also larger than that of the second region. For example, regions 29, 39 and 49 have a relatively high absorbance.

In each embodiment the materials comprise first regions which are positioned closer to the top surface than subsequent regions which have a average metal volume fraction which is larger than that of at least one of the subsequent regions. For example, the region 24 has a average metal volume fraction that is larger than that of the region 26, the region 36 has a average metal volume fraction that is larger than that of the region 38, the regions 43 and 44 have a average metal volume fraction that is larger than that of region 45 and region 46 has a average metal volume fraction that is larger than that of the region 48.

If the metal volume fraction is decreasing in a direction away from the surface into the material, as in the above described examples, the integrity of the solar absorptive material at elevated temperatures is improved.

In each embodiment the regions may have any thickness, but typically the regions, which may be layers, have thicknesses of more than 20 Ångstrom.

In each embodiment the material that comprises the regions has different or varying metal volume fractions dependent on the relative concentrations and combination of the first and second components. Regions with predetermined absorption properties can be fabricated by mixing the two components and then applying the mixed material to an absorber to form a layer of a multi-layered structure. Alternatively, the regions or layers may, for example, be prepared by physical or chemical vapour deposition methods such as ac or dc sputtering. Two sputter sources may be used, one for first component (for example a metallic component) and the other for the second component (for example a dielectric component). The relative deposition rate of the two components determines the relative metal volume fraction and therefore other characteristics such as the conductivity of the deposited layer.

Alternatively, each layer may be formed by depositing very thin layers of the first or second component, for example dielectric and metal sub-layers each having a thickness of only a few Ångstrom or less. As the sub-layers are extremely thin, they together have physical properties which correspond to an average of the metal volume fraction throughout the layer composed by the sub-layers.

Furthermore, the optimisation of the absorptive material is not limited to combining only two components.

The metallic component may comprise any metal, metallic alloy, metallic nitride, nitrites of transition metals, or any other materials. In this embodiment, however, the solar absorptive material comprises a silicide material such as a salicide material. Particularly suitable is a titanium silicide material, a tungsten silicide material, or cobalt silicide material, but a salicide material that comprises any other suitable metal may also be used.

Figure 5:
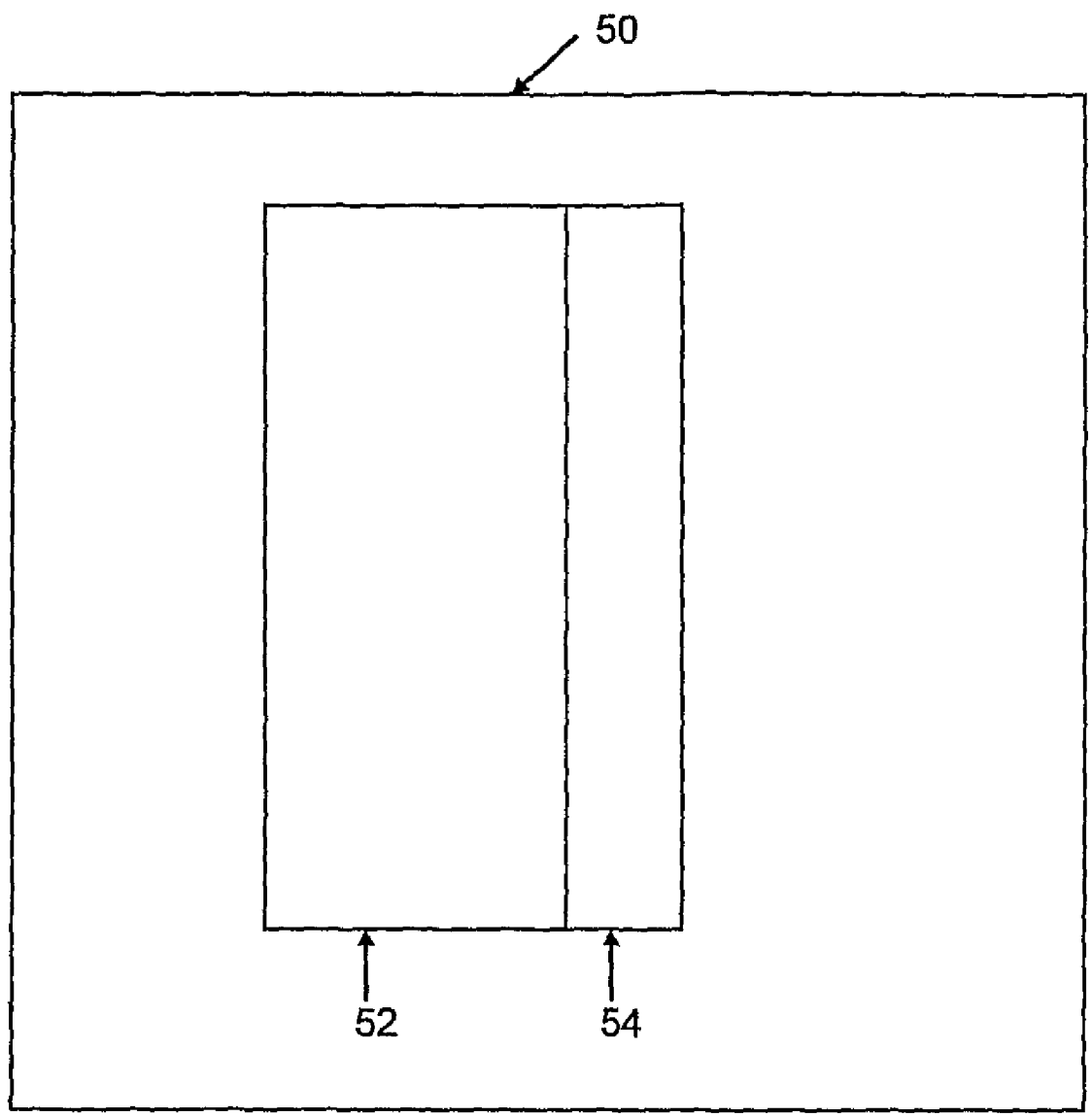

FIG. 5 schematically shows a solar absorber 50 having an absorber body 52 which is coated with a solar selective material 54 including the above-described absorptive material.

In a further embodiment of the present invention, the use of layers or graded sections of the absorbing material, where the metal volume fraction decreases in a direction from the top surface (receiving boundary) into the material, allows the absorptive material to be optimised for improved efficiency and other characteristics such as stability in air, adhesion of the layers, less oxidation, stress relaxation or reduction, improved resistance of diffusion (particularly heavy atoms) or permeability. For example a layer or layers having an increased average metal volume fraction compared with adjacent layers may be positioned at predetermined depth from the surface in a manner such that the efficiency of the solar selective material is improved.

In a further embodiment, the use of one or more regions where the metal volume fraction decreases in a direction from the top surface, allows for a larger number of regions with more variance of properties, such as metal volume fraction or optical constants, between the regions. This flexibility leads to improved optimisation of the material. For example the material can be optimised for interference effects over a wider wavelength range. From a manufacturing point of view there is more flexibility. For example, when using sputtering techniques the present invention allows for the sputtering to be less sensitive to deposition parameters compared to conventional techniques.

In a further embodiment, the larger number of regions due to the partial reversing of the depth profile leads to an absorber with more depth of absorbing material compared to one comprising only two regions or layers.

In a further embodiment, the top region, which may be a dielectric, extends further into the material.

Although the invention has been described with reference to particular examples, it will be appreciated by those skilled in the art that the invention may be embodied in many other forms. For example, even though the embodiments illustrated in FIGS. 2-4 show multi-layered structures, it will be appreciated that the absorptive material according to the present invention may also comprise only a single layer having a graded metal volume fraction that decreases from the surface through the thickness of the material.

Further, it will be appreciated by a person skilled in the art that the solar absorptive material may comprise more than one type of the first component (for example more than one type of a metallic material) and/or more than one type of the second component (for example more than one type of a dielectric material). The metal volume fraction may be substantially uniform throughout a layer or region and a variation of the conductivity and the absorbance properties of that layer can be achieved by using different types of metallic components throughout the layer which have different electrical conducting and absorptive properties. Alternatively, the metal volume fraction may vary throughout a layer or region but the conductivity and the absorbance properties of that layer may be substantially uniform throughout the layer or region.

The invention claimed is:

1. A solar absorptive material for a solar selective surface of an absorber of solar radiation, the solar absorptive material comprising:
    a dispersed metallic material,
    a receiving boundary through which the solar radiation is received, a first, a second and a third region, the first region being located at a position closer to the receiving boundary than the second region and having an average volume fraction of the dispersed metallic material that is larger than that of the second region, the third region being positioned at a distance below the receiving boundary that is further than that of the second region and having an average volume fraction of the dispersed metallic material that is larger than that of the second region.

2. The solar absorptive material of claim 1 comprising a fourth region positioned between the first region and the receiving boundary, the first region having an average volume fraction of the dispersed metallic material that is larger than that of the fourth region.

3. The solar absorptive material of claim 1 wherein at least one region comprises a dispersion of at least two material components and at least one of the material components comprises itself a composition of more than one material.

4. The solar absorptive material of claim 3 wherein at least one of the material components comprises the metallic material and at least one other material.

5. The solar absorptive material of claim 3 wherein each of the material components comprises the metallic material.

6. The solar absorptive material of claim 3 wherein at least one of the material components comprises a dielectric material.

7. The solar absorptive material of claim 1 wherein at least one of the regions the metallic material component is dispersed in a dielectric material.

8. The solar absorptive material of claim 1 in which one of the regions has a lower average volume fraction of the dispersed metallic material than an adjacent region and wherein the average volume fraction of the dispersed metallic material is selected so that the diffusion of metallic material from the adjacent region is substantially inhibited for a temperature range of 300° C. to 500° C.

9. The solar absorptive material of claim 1 comprising a silicide material.

10. The solar absorptive material of claim 9 comprising a salicide material.

11. The solar absorptive material of claim 1 wherein at least one region is a layer.

12. The solar absorptive material of claim 1 wherein a metal volume fraction of at least one of the regions decreases in a direction from the receiving boundary into the material in a gradual manner.

13. The solar absorptive material of claim 1 wherein at least one of the regions has a substantially uniform metal volume fraction.

14. An absorber having a solar selective coating comprising the solar absorptive material of claim 1 wherein the absorptive material is sandwiched between an outer layer and a metallic region.

* * * * *